(12) United States Patent
Johnson et al.

(10) Patent No.: US 7,496,532 B2
(45) Date of Patent: Feb. 24, 2009

(54) ENTERPRISE ASSET MANAGEMENT SYSTEM AND METHOD

(75) Inventors: Daniel T. Johnson, Wayzata, MN (US); James W. Peterson, Lake Elmo, MN (US); Robert S. McConnell, Woodbury, MN (US)

(73) Assignee: Verisae, Inc., Plymouth, MN (US)

( * ) Notice: Subject to any disclaimer, the term of this patent is extended or adjusted under 35 U.S.C. 154(b) by 638 days.

(21) Appl. No.: 09/883,779

(22) Filed: Jun. 18, 2001

(65) Prior Publication Data

US 2002/0016757 A1 Feb. 7, 2002

Related U.S. Application Data

(60) Provisional application No. 60/288,827, filed on May 5, 2001, provisional application No. 60/212,234, filed on Jun. 16, 2001.

(51) Int. Cl.
*G06Q 40/00* (2006.01)
(52) U.S. Cl. .......................................... 705/36; 705/14
(58) Field of Classification Search .............. 705/10–44
See application file for complete search history.

(56) References Cited

U.S. PATENT DOCUMENTS

| | | | |
|---|---|---|---|
| 4,612,620 A | 9/1986 | Davis et al. | |
| 4,688,026 A | 8/1987 | Scribner et al. | |
| 4,755,957 A | 7/1988 | White et al. | |
| 4,989,141 A * | 1/1991 | Lyons et al. | 705/36 |
| 5,079,930 A | 1/1992 | Beaverson et al. | |
| 5,198,774 A | 3/1993 | Williams, II et al. | |
| 5,231,841 A | 8/1993 | McClelland et al. | |
| 5,434,775 A * | 7/1995 | Sims et al. | 705/8 |
| 5,537,313 A | 7/1996 | Pirelli | 364/403 |
| 5,572,438 A | 11/1996 | Ehlers et al. | |
| 5,732,401 A | 3/1998 | Conway | |
| 5,748,956 A | 5/1998 | Lafer et al. | 395/615 |
| 5,752,244 A | 5/1998 | Rose et al. | 707/5 |
| 5,758,126 A | 5/1998 | Daniels | 395/500 |
| 5,821,937 A | 10/1998 | Tonelli et al. | 345/356 |
| 5,831,610 A | 11/1998 | Tonelli et al. | 345/335 |

(Continued)

FOREIGN PATENT DOCUMENTS

EP 1566875 8/2005

(Continued)

OTHER PUBLICATIONS

Dilger, Karen Abramic (Asset management, maintenance redefined), Manufacturing Systems, v15n7, pp. 122-128, Jul. 2997, CODEN: MASYES< ISSN: 0748-948X, JRNL CODE: MFS, Dialog file 15, Accession No. 01493159.*

(Continued)

*Primary Examiner*—Frantzy Poinvil
(74) *Attorney, Agent, or Firm*—Faegre & Benson LLP (57) ABSTRACT

A system and method for managing enterprise assets located at geographically distributed sites. The method includes storing in a database information relating to each asset, wherein the stored information includes cost of each asset and cost of service for each asset. The method further includes tracking and storing information relating to servicing of the assets, including the cost of servicing. Information relating to the assets is then displayed to a user of the system.

39 Claims, 8 Drawing Sheets

U.S. PATENT DOCUMENTS

| | | | |
|---|---|---|---|
| 5,845,265 A | 12/1998 | Woolston | 705/37 |
| 5,859,778 A | 1/1999 | Kuroda et al. | |
| 5,860,286 A | 1/1999 | Tulpule | |
| 5,910,776 A | 6/1999 | Black | |
| 5,918,207 A | 6/1999 | McGovern et al. | |
| 5,923,850 A | 7/1999 | Barroux | 395/200.54 |
| 5,946,662 A | 8/1999 | Ettl et al. | 705/8 |
| 5,956,658 A | 9/1999 | McMahon | |
| 5,980,090 A | 11/1999 | Royal, Jr. | 364/479.11 |
| 5,987,903 A | 11/1999 | Bathla | |
| 5,996,889 A | 12/1999 | Fuchs et al. | |
| 6,128,602 A * | 10/2000 | Northington et al. | 705/35 |
| 6,154,738 A | 11/2000 | Call | |
| 6,169,979 B1 | 1/2001 | Johnson | |
| 6,293,114 B1 | 9/2001 | Kamemoto | |
| 6,298,333 B1 | 10/2001 | Manzi et al. | |
| 6,385,510 B1 | 5/2002 | Hoog et al. | |
| 6,430,542 B1 * | 8/2002 | Moran | 705/36 |
| 6,437,692 B1 | 8/2002 | Petite et al. | |
| 6,650,346 B1 | 11/2003 | Jaeger et al. | |
| 6,952,680 B1 * | 10/2005 | Melby et al. | 705/28 |
| 7,062,446 B1 * | 6/2006 | Suhy et al. | 705/1 |
| 7,124,059 B2 * | 10/2006 | Wetzer et al. | 702/184 |
| 2001/0047383 A1 | 11/2001 | Dutta | |
| 2002/0059364 A1 | 5/2002 | Coulthard et al. | |
| 2002/0138361 A1 | 9/2002 | Chen | |
| 2003/0154141 A1 | 8/2003 | Capazario et al. | |
| 2004/0024662 A1 | 2/2004 | Gray et al. | |
| 2004/0162642 A1 | 8/2004 | Gasper et al. | |
| 2006/0170889 A1 | 8/2006 | Honda | |
| 2006/0256308 A1 | 11/2006 | Honda | |

FOREIGN PATENT DOCUMENTS

| | | |
|---|---|---|
| JP | 10340846 | 12/1998 |
| JP | 2004-301825 | 10/2004 |
| WO | 9941717 | 8/1999 |
| WO | WO 99/66436 A1 | 12/1999 |
| WO | 0017984 | 3/2000 |
| WO | WO 01/97146 A1 | 12/2001 |
| WO | 0207365 | 1/2002 |
| WO | WO 02/090914 A1 | 11/2002 |
| WO | 2005048328 | 5/2005 |
| WO | 2005062351 | 7/2005 |

OTHER PUBLICATIONS

Morphy, Erika, "Life insureres, facing pressure from different directions, turn conservative:, (industry News)", Insurance Finance & Investment, v7, n19, p. 11, Oct. 28, 2002, Dialog file 636, Accession No. 05405189.*

Compliance Guidance for Industrial Process Refrigeration Leak Repair Regulations Under Section 608 of the Clean Air Act (Oct. 1995).

Developing an EPA Refrigerant Regulations Compliance Program (Mar. 29, 2002).

International Search Report dated May 28, 2004.

International Search Report dated Oct. 15, 2004.

Dilger, Karen Abramic, Asset management, maintenance redefined, *Manufacturing Systems*, v15n7,pp. 122-128, Jul. 1997, CODEN:MASYES<ISSN: 0748-948x, jrnl code: mfs, Dialog file 15. Accession No. 01493159.

Pays, P. et al., An intermediation and payment system technology, *Computer Networks and ISDN Systems*, North Holland Publishing, Amsterdam, NL, vol. 28, No. 11, May 1996, pp. 1197-1206, ISSN: 0169-7552.

"The Greenhouse Gas Protocol: A Corporate Accounting and Reporting Standard," World Resources Institute, 114 pp.

"Equipment Containing Ozone Depleting Substances at Industrial Bakeries," EPA, Federal Register, Feb. 2002: 67(25): 5586-5595.

European Search Report from European Patent Application No. 07252399.6, dated Sep. 20, 2007, 7 pp.

International Search Report for published application No. WO2004053772 (app. PCT/US2003/039251), republished on Aug. 26, 2004, 3 pp.

International Preliminary Examination Report of international application No. PCT/US2003/039251, completed May 3, 2005, 9 pp.

Written Opinion of international application No. PCT/US2003/039251, mailed Sep. 15, 2004, 5 pp.

International Search Report, mailed Nov. 23, 2001, and Written Opinion, mailed Jun. 11, 2002, for international application No. PCT/US2001/019491, 9 pp.

International Search Report and Written Opinion for international application No. PCT/US2004/027165, filed Aug. 20, 2004, both mailed Feb. 21, 2005, 10 pp.

International Preliminary Examination Report for international application No. PCT/US2003/039517, filed Dec. 12, 2003, completed Mar. 29, 2005, 7 pp.

International Search Report, mailed Nov. 4, 2004, and Written Opinion, mailed Oct. 15, 2004, for linternational application No. PCT/US2003/039517, 13 pp.

International Preliminary Examination Report of International application No. PCT/US2001/019491, completed Dec. 1, 2002, 9 pp.

International Preliminary Examination Report (with written opinion) of International application No. PCT/US2004/027165, issued Feb. 21, 2006, 7 pp.

Terplan, "Web-Based Systems & Network Management," CRC Press, pp. 1-43, 1999.

International Search Report, for related case, WO/2004/055608, dated Nov. 18, 2004. 4pgs.

International Preliminary Report on Patentability (IPER), for related case, PCT/US03/39517, dated Mar. 29, 2005., 7pgs.

Office Action received in related case, U.S. Appl. No. 11/431,147, dated May 9, 2008. 8pgs.

Applicant Response to May 9, 2008, Office Action, in related case, U.S. Appl. No. 11/431,147, filed Aug. 11, 2008, 62pgs.

Office Action received in related case, U.S. Appl. No. 10/768,957, dated Jun. 30, 2005. 5pgs.

Applicant Response to Jun. 30, 2005, Office Action, in related case, U.S. Appl. No. 10/768,957, filed Oct. 27, 2005; recorded Oct. 31, 2005, 11 pgs.

Office Action received in related case, U.S. Appl. No. 11/357,330, dated Nov. 17, 2006. 6 pgs.

Office Action received in related case, U.S. Appl. No. 11/423,860, dated Jun. 18, 2007. 6pgs.

Applicant Response to Jun. 18, 2007, Office Action, for related case U.S. Appl. No. 11/423,860, filed Nov. 21, 2007. 18pgs.

Australian Application No. 20003296444, Examination Report dated Jun. 24, 2008. 3pgs.

International Search Report and Written Opinion, for related case, PCT/US07/68420, mail date Sep. 29, 2008, 10pgs.

European Patent Office Action, in related case, 04781780.4-2221 PCT/US2004027165 dated May 12, 2006., 2pgs.

European Patent Office Action, in related case, 04781780.4-2221, dated Nov. 20, 2006, 2pgs.

Response to European Patent Office Action, for related case, 04781780.4-2221, dated May 25, 2007, 13pgs.

International Search Report, in related case, PCT/US01/19491, mailing date, Nov. 23, 2001. 3pgs.

Written Opinion in related case, PCT/US01/19491, mailing date Jun. 11, 2002. 4gs.

Response to Written Opinion, in related case, PCT/US01/19491, mailing date Sep. 12, 2002. 12pgs.

International Preliminary Examination Report, in related case, PCT/US01/19491, mailing date Dec. 13, 2002. 9pgs.

Written Opinion, in related case, PCT/US04/03008, mailing date Sep. 15, 2005. 9pgs.

International Search Report and Written Opinion, in related case, PCT/US07/68420, mailing date, Sep. 29, 2008, 10pgs.

International Preliminary Report, in related case, PCT/US04/027165, mailing date Mar. 2, 2006, 7pgs.

* cited by examiner

Verisae Roles - Master Filter Factor Groups, Factors, Values & Defaults

Factor Group = A grouping of fields that are related in concept and can have one or more Factors.
Factor = A Field that we allow the user to assign a value to that will be used in filtering the information displayed in the Work Space.
Value = One of the acceptable values for any given field. Used as the value in query for the Master Filter.

| Factor Groups & Factors | Value Type | Default Possible | Edit Yes / No / Down |
|---|---|---|---|
| +Geography | | | |
| Country | Possible Values | Blank / Show All | Yes |
| State/Province | Possible Values | Blank / Show All | Yes |
| City | Possible Values | Blank / Show All | Yes |
| Postal Code | Possible Values | Blank / Show All | Yes |
| +Organizational | | | |
| Client | Possible Values | Blank / Show All | Yes |
| Organization | Possible Values | Blank / Show All | Yes |
| Affiliate | Possible Values | Blank / Show All | Yes |
| Fact Type | Possible Values | Blank / Show All | Yes |
| Site | Possible Values | Blank / Show All | Yes |
| +Service Provider | | | |
| SP Organization | Possible Values | Blank / Show All | Yes |
| SP Site | Possible Values | Blank / Show All | Yes |
| Preferred (Y/N) | Possible Values | Blank / Show All | Yes |
| +Work Order | | | |
| Number | Possible Values | Blank / Show All | Yes |
| Status | Possible Values | Blank / Show All | Yes |
| Type | Possible Values | Blank / Show All | Yes |
| Date Created Range | Start Date, End Date | Blank / Show All | Yes |
| Date Completed Range | Start Date, End Date | Blank / Show All | Yes |
| Technician | Possible Values | Blank / Show All | Yes |
| Part Number | Possible Values | Blank / Show All | Yes |
| Service Action | Possible Values | Blank / Show All | Yes |
| Billable Labor Range | Low Value, High Value | Blank / Show All | Yes |
| Work Order Cost Range | Low Value, High Value | Blank / Show All | Yes |
| +Service Visit | | | |
| Number | Possible Values | Blank / Show All | Yes |
| Number of Trips | Possible Values | Blank / Show All | Yes |
| Service Visit Cost Range | Low Value, High Value | Blank / Show All | Yes |
| +Invoice | | | |
| Number | Possible Values | Blank / Show All | Yes |
| Status | Possible Values | Blank / Show All | Yes |
| Date Created Range | Start Date, End Date | Blank / Show All | Yes |
| Invoice Cost Range | Low Value, High Value | Blank / Show All | Yes |
| +Assets | | | |
| Asset Type | Possible Values | Blank / Show All | Yes |
| Work Center | Possible Values | Blank / Show All | Yes |
| In Service Date Range | Start Date, End Date | Blank / Show All | Yes |
| Warranty Expiration Date Range | Start Date, End Date | Blank / Show All | Yes |
| Preventative Maintenance (Y/N) | Possible Values | Blank / Show All | Yes |
| +Manufacturer | | | |
| Manufacturers Site | Possible Values | Blank / Show All | Yes |
| +Calls | | | |
| Call Status | Possible Values | Blank / Show All | Yes |
| Action Type | Possible Values | Blank / Show All | Yes |
| Reason Type | Possible Values | Blank / Show All | Yes |
| Call Date Range | Start Date, End Date | Blank / Show All | Yes |

Active Call

| | |
|---|---|
| Site | T-0664 |
| Requester | Terry Haughton |
| Description | Lack of power. Battery appears not be charging |
| Reason Type | Out of Service |
| AssetType | Dane QuickKart 4000 |
| Asset Number | 1854 |
| Serial Number | 0059 |
| Action Type | Creat Work Order |
| Status | Open |

[Save] [WO] [New]

---

WorkSpace | Filter Definition — 52

Sites | Service & Maintenance | Asset Types | Service Providers | Manufacturers | Reports | Messages > Outstanding Work Orders | Approvals | All Work Orders | Service Calls | Invoices | Payables | Generate PM Work Orders — 51

All Work Order

| Status | Site Name △ | Work Order # | Work Order Name | Asset Type | Service Provider |
|---|---|---|---|---|---|
| Due 01/25/2001 | T-0001 | 71 | LF Tire out of align | Dane QuickKart 4000 | Western Electric |
| Due 01/27/2001 | T-0024 | 72 | Wheels locked | Dane QuickKart 4000 | Western Electric |
| Due 01/28/2001 | T-0100 | 73 | the ck is broke | Dane QuickKart 4000 | Western Electric |
| Invoice | T-0100 | 63 | Remote intermittent | Dane QuickKart 2000 | Western Electric |
| Overdue | T-0100 | 62 | Left tire flat | Dane QuickKart 2000 | Western Electric |
| App | T-0100 | 59 | Remote not working | Dane QuickKart 2000 | Western Electric |
| Invoice | T-0100 | 64 | Remote not working | Dane QuickKart 2000 | Western Electric |
| Due 02/01/2001 | T-0664 | 74 | Lack of power, Batt | Dane QuickKart 4000 | Western Electric |
| App | T-0664 | 67 | Quick Kart is broken | Dane QuickKart 4000 | Western Electric |
| Rejected | T-0664 | 68 | Remote broken | Dane QuickKart 4000 | Morrison West |
| Inv. Rend | T-0664 | 58 | Lift strut leaking h | Crown Walkie Stackr | Morrison West |
| Appv Rand | T-0664 | 61 | Steering wheel loose | Dane QuickKart 4000 | Morrison West |
| Invoice | T-0664 | 60 | Rear hitch broken | Dane QuickKart 4000 | Western Electric |
| Appv Rand | T-0664 | 65 | Remote not working | Dane QuickKart 4000 | Western Electric |
| Appv Rand | T-0664 | 66 | Flat it | Dane QuickKart 4000 | Western Electric |

Show all 7 | Groups of 15 | Next 2 — 53

[New]

Verisae Entyerprise Asset Managment & Maintenance System

ENTERPRISE ASSET MANAGEMENT SYSTEM AND METHOD

CROSS-REFERENCE TO RELATED APPLICATION(S)

This application claims priority from U.S. provisional application No. 60/212,234, filed Jun. 16, 2000 and 60/288,827, filed May 5, 2001 both of which are hereby incorporated by reference in their entirety.

TECHNICAL FIELD

This invention relates to a method and system for managing enterprise assets. More particularly, the invention relates to a method and system for the comprehensive management of enterprise assets dispersed over a plurality of distributed sites.

BACKGROUND OF THE INVENTION

It is frequently useful to determine the total cost of ownership (meaning the total cost of owning one or more assets) and to track components of the total cost of ownership for an asset within an enterprise for accounting purposes and for making future purchasing decisions. However, tracking costs attributed to each specific asset in a large, distributed environment (an enterprise that has many facilities at differing locations, as well as one or more central headquarters) can be a difficult task.

A large retail store chain, for instance, may wish to determine the total cost of ownership for each cash register it owns. A highly distributed retail chain may have tens of thousands of cash registers, and in order to calculate a reasonably accurate determination of the total cost of ownership the retail chain must accurately track all the costs that are incurred for each cash register. The purchase price of an asset, repair costs, and maintenance costs are the main components of the total cost of ownership and so these costs need to be tracked, in some instances other factors such as energy costs may also need to be factored into the calculation.

However, tracking costs incurred in repairing and maintaining these assets can be an onerous task. In a typical procedure to service assets, a store manager first calls a service provider to perform a task on an asset. The service provider performs the task required, seeks approval for the work, and then fills out work order papers in triplicate. The work order papers are typically distributed (one copy each) to the enterprise headquarters, the store, and the service provider. The service provider then creates an invoice and sends it to the enterprise headquarters. If the accounts payable department of the enterprise headquarters can locate the work order papers, the invoice may be entered into the system and paid. If the work order papers cannot be found, the invoice may be sent to the store manager for approval, returned to the enterprise headquarters after approval, and then entered into the accounts payable system.

Tracking part and labor costs in highly distributed enterprises thus becomes very difficult using the existing process described above. Matching paperwork with assets may become exceedingly difficult due to the sheer volume of assets and the large amounts of paperwork generated in servicing and maintaining the assets.

Another potential problem with the process described above is that service providers may be able to overbill for service calls or parts without full knowledge by the enterprise of the nature of the service call. The lack of overview on a regional or national level may prevent an enterprise from determining if the costs incurred by distributed sites for an asset is reasonable.

Because it is time consuming and expensive to collect paper work from numerous sources to even have the capability of accurately calculating the total cost of ownership for an asset, the cost of ownership of many assets is frequently a guess that may vary greatly from the actual cost of ownership. Thus, enterprises frequently determine the cost of ownership for an asset to be the purchase price of the asset, which is typically considerably less than the actual cost of ownership. Moreover, in a highly distributed environment, there are many assets to manage, and current systems do not provide feasible and efficient methods and systems for managing such assets. In particular, current systems do not provide for an efficient manner to determine the costs of servicing and maintaining assets or the total cost of ownership of an asset.

A need exists for a method and system for managing enterprise assets over numerous distributed sites that is user friendly, cost and time efficient, and that may be used to accurately generate the cost of ownership for one or more assets of an enterprise. A need also exists for a common platform that may be used to set up information systems and gather accounting information for managing these assets including total cost of ownership accounting.

BRIEF SUMMARY OF THE INVENTION

The subject invention is a system and method for comprehensively tracking and monitoring asset information and for calculating a total cost of ownership. The subject invention includes novel means for collecting and storing information about a number of enterprise assets, and further includes novel means for tracking and storing information about repair and maintenance of enterprise assets so that a relatively accurate total cost of ownership can be determined.

In one embodiment, the subject invention includes a web site hosted on a server in communication with a computer network, such as the internet. The embodiment also includes a database in communication with the web site for storing asset information. In this embodiment, various users of the system (e.g., enterprise personnel, service providers, and equipment manufacturers) are allowed differing levels of access to applications located within the web site so that asset information can be easily inputted or downloaded through a client processor or kiosk.

In another embodiment, the subject invention includes a method of managing assets wherein each asset is identified by a particular asset identifier and factors pertaining to each asset are linked to each asset identifier. This embodiment also includes submitting a user request for specific information to a web site and having the website filter the asset information so that the information requested can be displayed on a client computer.

In yet another embodiment, the subject invention includes a method for generating service requests which allows a user, or in some cases, the asset itself to request service electronically. This embodiment includes determining a service provider for the particular asset in need of service, and automatically generating an E-mail message to an appropriate service provider for the asset.

In yet another embodiment, the subject invention also includes a compact menu configuration that allows the various users to quickly and easily navigate the various screens displayed on the client processor. This configuration includes upper and lower horizontally-disposed sections that houses multiple levels of functions while consuming minimal space on the user interface screen.

While several embodiments are disclosed, still other embodiments of the subject invention will become apparent to those skilled in the art from the following detailed description, wherein is shown and described only the embodiments of the invention, by way of illustration, of the best modes contemplated for carrying out the invention. As will be realized, the invention is capable of modifications in various obvious aspects, all without departing from the spirit and scope of the subject invention. Accordingly, the drawings and detailed description are to be regarded as illustrative in nature and not restrictive.

BRIEF DESCRIPTION OF THE DRAWINGS

FIG. 3 is a table displaying one possible set of factor groups and factors.

FIG. 5 is a web page for screening asset information.

DETAILED DESCRIPTION OF THE INVENTION

A. System Configuration

Figure 1:
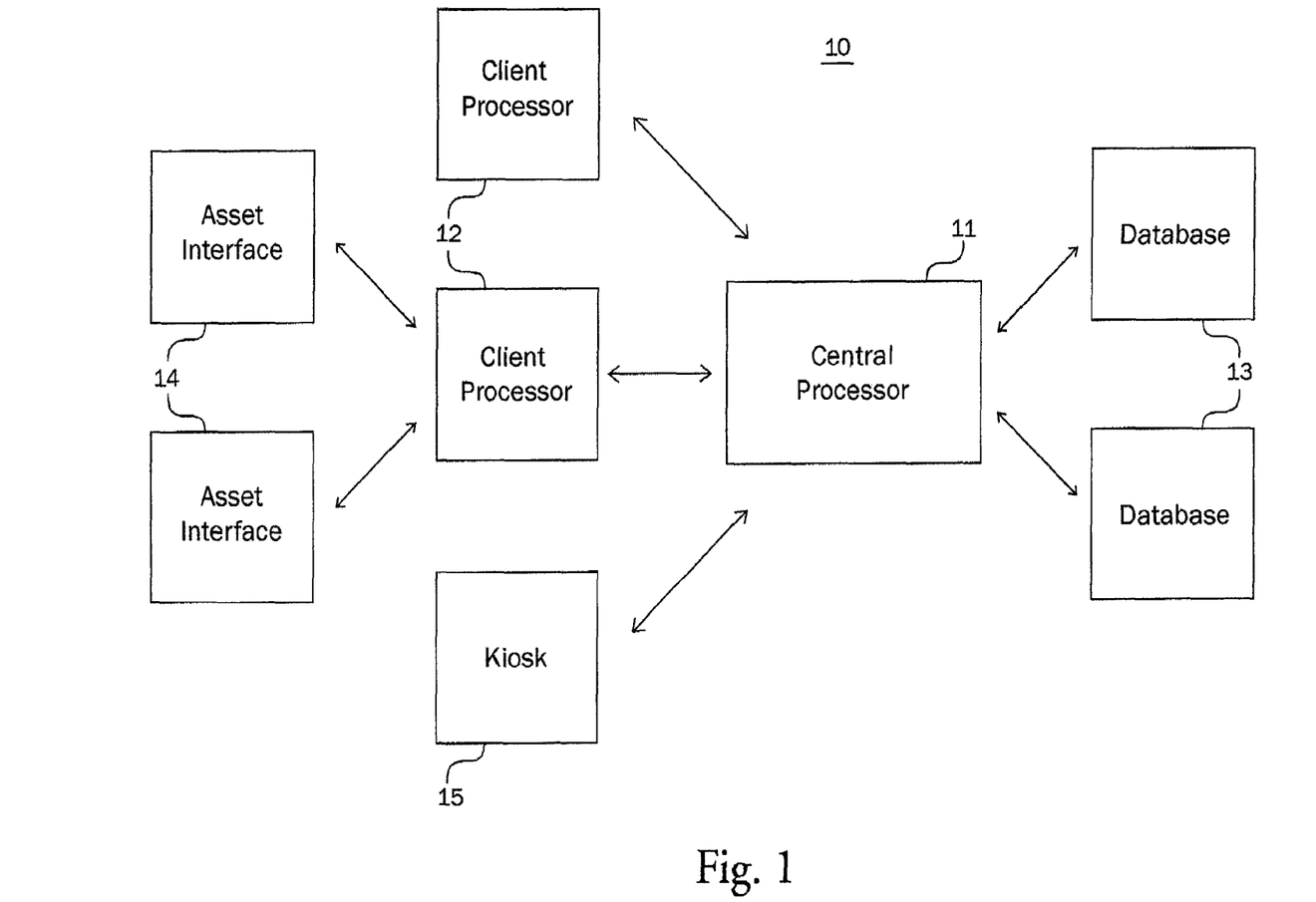
FIG. 1 is a block diagram showing the various components of the enterprise asset management system, according to one embodiment of the subject invention.

FIG. 1 shows an embodiment of an asset management system 10 in accordance with one embodiment of the subject invention. This embodiment is comprised of a central processor 11 located at a central location, one or more databases 13 to store asset information, and a plurality of client processors 12 located at a plurality of remote locations. In one embodiment, the system 10 includes asset interfaces 14 connected directly to particular assets, and one or more kiosks 15acting as a client processor 12.

The central processor 11 can be any computer known to those skilled in the art, including standard attachments and components thereof (e.g., a disk drive, hard drive, CD player or network server that communicates with a CPU and main memory, a sound board, a keyboard and mouse, and a monitor). The processor of the CPU in the computer may be any conventional general-purpose single- or multi-chip microprocessor. In addition, the processor may be any conventional special purpose processor such as a digital signal processor or a graphics processor. The microprocessor has conventional address lines, conventional data lines, and one or more conventional control lines. In one embodiment, the central processor 11 includes a website hosted in at least one or more computer servers. These servers may comprise web servers, database servers and/or application servers, and they run on a variety of platforms, including UNIX machines, Windows 2000, Windows NT, and Macintosh.

The central processor 11 includes software programs or instructions that run on the server-side to process requests and responses from a client processor 12. These software programs or instructions send information to the client processor 12, perform compilation and storage functions, generate reports that may be used by either the clients or the headquarters of the enterprise, or carry out asset management functions. The software may be software applications commercially sold and normally used by those skilled in the art or they may be specific applications coded in a standard programming language. Further details of the functions performed by the software are provided below.

The central processor 11 allows access by the client processor to various network resources. In one embodiment, the central processor 11 also has access, via direct dial or the internet, to external data sources, such as manufacturer web pages or manufacturer programs that may be used to keep the information in the server current. A number of client processors 12 may be connected to the server at any given time, and therefore a number of different facilities or service providers may utilize the subject invention simultaneously.

The system 10 can also include one or more databases 13 for storing asset information. The database may be of any type generally known in the art. In one embodiment, a scaleable database (e.g., Oracle) is used to allow for expansion as the amount of information tracked increases.

These databases 13 may be integral to the central processor 11 or they may be accessible to the central processor through a computer network or other suitable communication link. The databases 13 servers operated by the system proprietor, and/or may include external databases operated by a remote entity, such as a manufacturer of an asset, that is accessible through a computer network. In one embodiment, the database 13 is comprised of a plurality of database servers, some of which are integral to the central processor 11, and some that are located remotely from the central processor 11.

The client processor 12 may be any computer or computer systems used by those skilled in the art. The client processor 12 comprises a central processor unit ("CPU") and main memory, an input/output interface for communicating with various databases, files, programs, and networks (such as the Internet), and one or more storage devices. The storage devices may be disk drive devices or CD-ROM devices. The client processor 12 may also have a monitor or other screen device and an input device, such as a keyboard, a mouse, or a touch sensitive screen.

Client processor 12 can be used to place work orders, view asset information, input asset information, change the operational parameters of an asset, exchange data with the central processor, and/or to view and manipulate asset information. In order to enable the user to perform these functions, in one embodiment, the client processor 12 also has some software programs contained in the main memory or the storage devices that can be used by the CPU to perform the above functions. In one embodiment, a web browser such as Netscape Navigator, Microsoft Internet Explorer, Mosaic, or Lynx is included in the client processor to enable the client processor to exchange, interpret, and/or display information accessed via the Internet.

Figure 2:
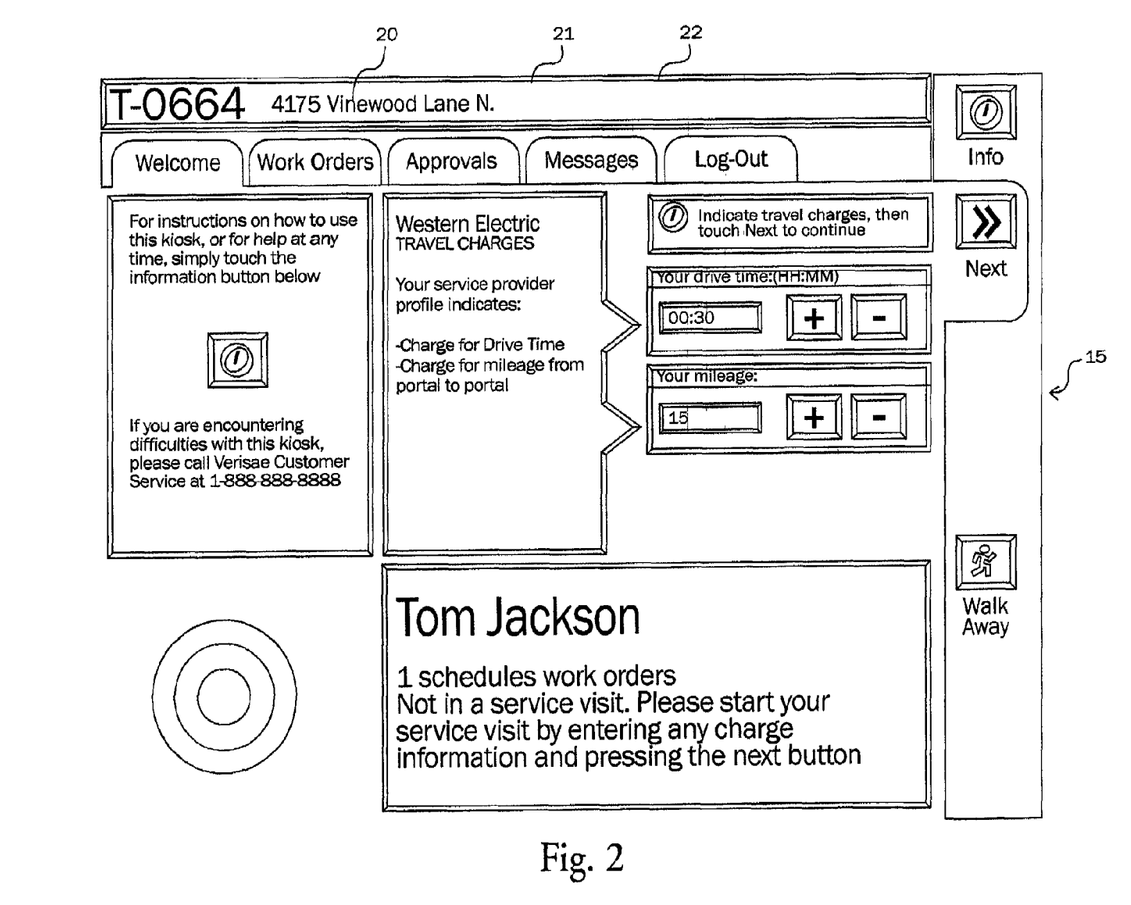
FIG. 2 is an embodiment of a screen display for a kiosk.

Some client processor 12 can be configured as kiosks 15 and located at one or more remote sites. The kiosks are adapted for use by service providers onsite, to access the central processor 11 to view asset information or service requests. As shown in FIG. 2, these kiosks can include a preconfigured menu which allows service providers to access the central processor 11, to enter and receive information concerning work orders 20, to check if a particular work order has been approved 21, and to check for messages 22. In one embodiment, the kiosks 15 can include magnetic or barcode readers to allow a service provider to swipe an identification card having a bar code or similar identification strip in order to obtain access to the central processing unit 12 or the kiosks 15 may require the input of a secret pin number.

In some embodiments, asset interfaces 14 are attached to assets with communications capabilities in order to monitor and/or control its performance. It is common for certain assets to have ports through which performance characteristics and/or failure signals can be obtained. It is also common for some assets to have bi-directional communication capabilities that enable the asset to be monitored and operated remotely. The asset interface 14 can be configured to communicate with the asset and to provide a communication link between the asset and a client processor 12 or the central processor 11.

Communication technology, such as a cellular modem, any other wireless communication system, and/or a landline communication system may be used to form a communication link between the asset interface and a client processor 12 or the central processor 11. Preferably, a wireless technology, such as Cellular Digital Packet Data (CDPD) technology is used to transfer information between the asset interface 14 and a client processor 12 or the central processor 11. CDPD technology may both receive and transmit data quickly and efficiently with minimal error. As an alternative to or in addition to a wireless communications unit, a land-line telephone connection may also be used.

As shown in FIG. 1, a communication link exists between a client processor 12 and the central processor 11. This link can be achieved through a variety of means commonly known by those with skill in the art. The system and method of the invention may use the "World Wide Web" ("web" or "WWW"), which is a collection of servers on the Internet that utilize the Hypertext Transfer Protocol ("HTTP"). The Internet is a collection of computer networks that allows computer users to share files and other computer resources. Each computer connected to the Internet has a unique address whose format is defined by the Internet Protocol ("TCP/IP").

HTTP is a known application protocol that provides users access to resources, which may be information in different formats such as text, graphics, images, sound, video, Hypertext Markup Language ("HTML"), as well as programs. HTTP allows for the transmission of certain information between the client processor 12 and a server.

Upon specification of a link by the user, the client processor 12 makes a TCP/IP request to the central processor 11 and receives information, which may be a "web page" that is formatted according to HTML which also includes links to other pages of information. Users can also access other pages on the same or other database server by following instructions on the screen, entering certain data, or clicking on selected icons. It should also be noted that any type of selection device known to those skilled in the art, such as check boxes, drop-down boxes, and the like, may be used for embodiments of the invention using web pages to allow a user to select options for a given task.

In one embodiment, the subject invention is a web-site hosted by at least one computer in communication with the internet. This embodiment allows the subject invention to be accessed through a client computer 12 by various types of users located at geographically distributed sites. To limit access to authorized users, in one embodiment, the subject invention allows for various types of users and users at various distributed sites to have distinct levels of access. For example an enterprise or store user, in one embodiment, has full access to all assets and all pending work orders pertaining to his or her store. A service provider user has access to all assets of a type that he services and all work orders that he is responsible for fulfilling. These assets may include assets located at various distributed sites and may even include assets owned by distinct enterprises. An equipment manufacturer may have access to the assets at the various distributed sites that it manufactured.

Levels of access can be controlled by specifying securable or configurable attributes for each system user. These attributes can be specified by a system administrator, who may be an enterprise asset management company or may be with the enterprise itself. In one embodiment, the securable attributes are pre-defined based on the type of user. For example, user can have access to assets based on hierarchical levels within an enterprise. If the user is a regional manager, he will have access to assets in all of the locations of his store within his region. If the user is manager of a particular location, access may be limited to assets within that particular location.

The user's level of access can also be defined by his assigned roles and rights. Like the user's securable attributes, the user's roles and rights may be pre-specified by using a type of user, such as a "store manager." Based on the user's type, he is given certain rights and roles. In one example, the rights that are granted or denied include the right to create new users (having access at the current user's level or below), the right to add or modify assets, and the right to submit work orders.

B. Asset Management

The subject invention includes a system and method used to track the costs of assets and to facilitate the servicing of assets. As an initial procedure, the assets of an enterprise may be inventoried and an asset identifier created for each asset to give it a trackable identity. One method for inventorying assets is further discussed below. As shown in FIG. 3, factors to be monitored are also created to enable a determination of asset information to be stored, and to enable differentiation of asset information. These factors may also be grouped together into factor groups in order to facilitate screening of stored asset information. In order to calculate a total cost of ownership, information such as cost of the asset, repair costs, and maintenance costs are typically stored as factors for each asset.

Figure 4A:
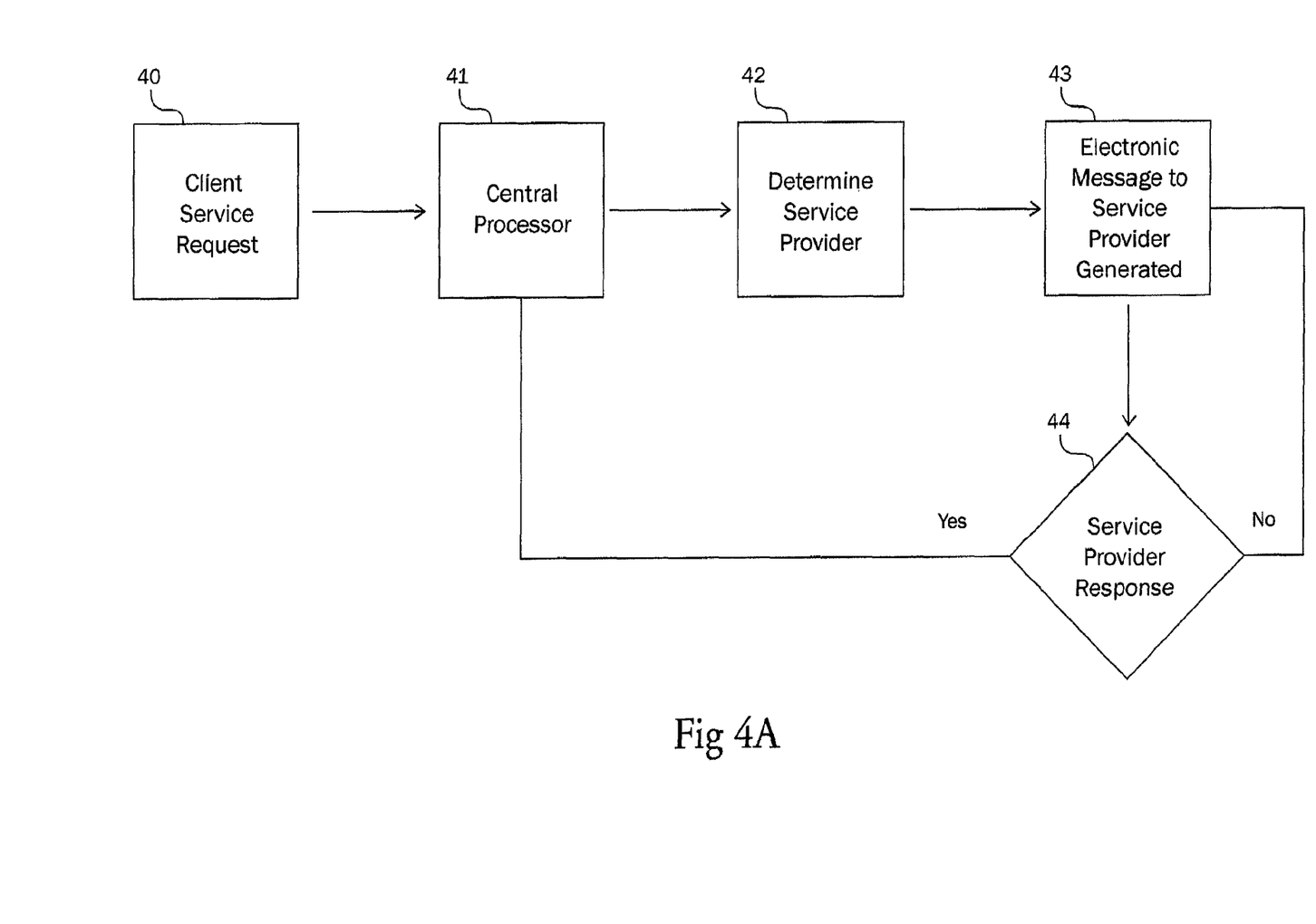
FIG. 4a is a flow diagram of a service request.

In order to track repair and maintenance costs and to monitor the servicing of assets, the subject invention includes a system and method for managing the servicing and maintenance of assets by third-party service providers or inhouse personnel. As shown in FIG. 4a, the method generally comprises generating a service request from a client computer (block 40), receiving a service request at the central processor 11 through the web site (block 41), determining a service provider (block 42), automatically transmitting to the service provider the service request and any additional asset information which may be needed by the service provider (block 43), and awaiting a response to the service request (block 44). If no response is received within a predetermined period of time, the electronic message is resent (block 43).

Figure 4B:
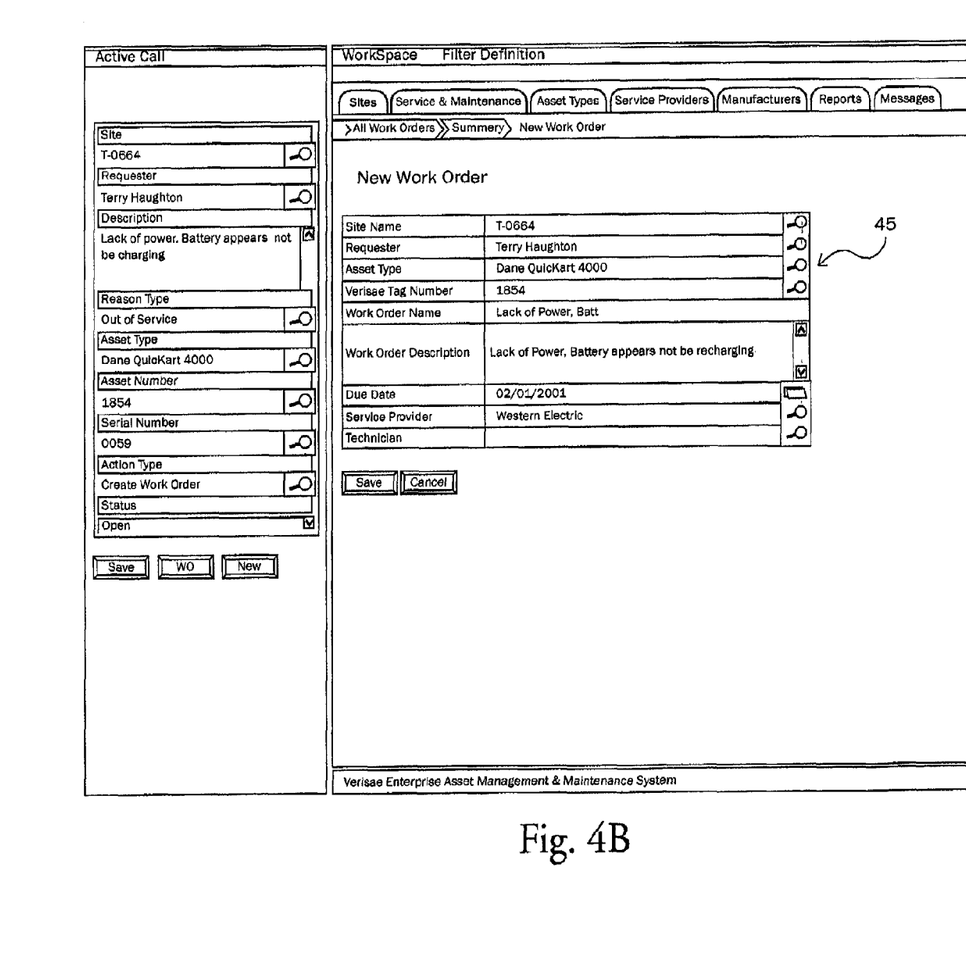
FIG. 4b is an embodiment of a web page for inputting a service request.

As shown in FIG. 4b, a service request from a user will generate an electronic work order 45 containing information such as the asset to be repaired, location of the asset site, the reported problem, and the asset identifier. Typically, a service request is initiated by enterprise employees located at a remote site through the use of a client computer 12. In some instances, a particular asset may have self-diagnostic programs that can determine a malfunction and generate an error signal. These assets may have asset interfaces 14 interfaced thereto enabling them to generate service requests automatically through a client computer 12.

In one embodiment, an identification of authorized service personnel is maintained in a database and linked to particular assets. Once a service request is processed by the central processor 11, a service provider is determined automatically by determining which service provider is linked to the particular asset and a particular geographic location, and the service provider is notified automatically via an E-mail message or other form of electronic messaging. If the service provider does not respond to an E-mail within a specified period of time, additional E-mails may be sent automatically. The E-mail can include the type of asset requiring service, the reported failure, location, contact person, and prior service history of the asset. In addition, the service provider may also obtain additional information on the asset by accessing the central processor 11 via the internet or a kiosk 15.

After a service request is completed, information pertaining to the repair or maintenance of an asset may be gathered from service providers through the web site or through a client computer 12 or a kiosk 15 and stored in the database 13. For instance, the cost of replacement parts may be inventoried in the database of the system and the service provider may choose, while at the remote location of the facility, the type of replacement part that is used. The cost of this replacement part, therefore, may be allocated to the asset that was repaired. In addition, the cost of the service charge may be ascertained based on the length of the visit of the service provider and this cost of service may be allocated to the repaired asset. The submission of information relating to the service provided can be used to trigger payment for the service.

In order to determine total cost of ownership and to monitor certain asset information, the subject invention also includes a filtering and compilation application that allows the user to filter or compile asset information located within a database 13 so that only desired information is displayed. In one embodiment, a filter operates by prompting a user through a client computer 12 to define criterion for the filtering of asset information, and submitting that definition along with the user's securable attributes, to the central processor 11. The central processor 12 then applies the criterion to the asset information and returns the appropriate data set for viewing by the user at the client.

As shown in FIG. 5, in this embodiment, a first—horizontally disposed section 51 contain sets of tabs defining separate primary categories which can be queried. A second—horizontally disposed section 52 defines subcategories of the primary categories. Selection of a category and a subcategory will cause the display of a formatted query box 50 utilized to set specific user criteria. Once the criteria has been submitted the asset information is displayed in table 53.

Since the maintenance and repair costs as well as purchase price comprise a majority of the total cost of ownership of an asset, a relatively accurate calculation can be obtained by summing up the three. Other factors such as energy costs, performance costs, and other can also be factored into the calculation if these factors are stored for the particular asset. To calculate the total cost of ownership, the total costs for maintenance and repair and the purchase price for an asset or a group of assets is compiled using the filtering procedures above and the values are summed together. In one embodiment of the present invention, the calculation is pre-programmed into software located in the central processor 11 and the calculation is done automatically by simply selecting the function and inputting the asset identifiers.

C. Additional Features

Figure 6:
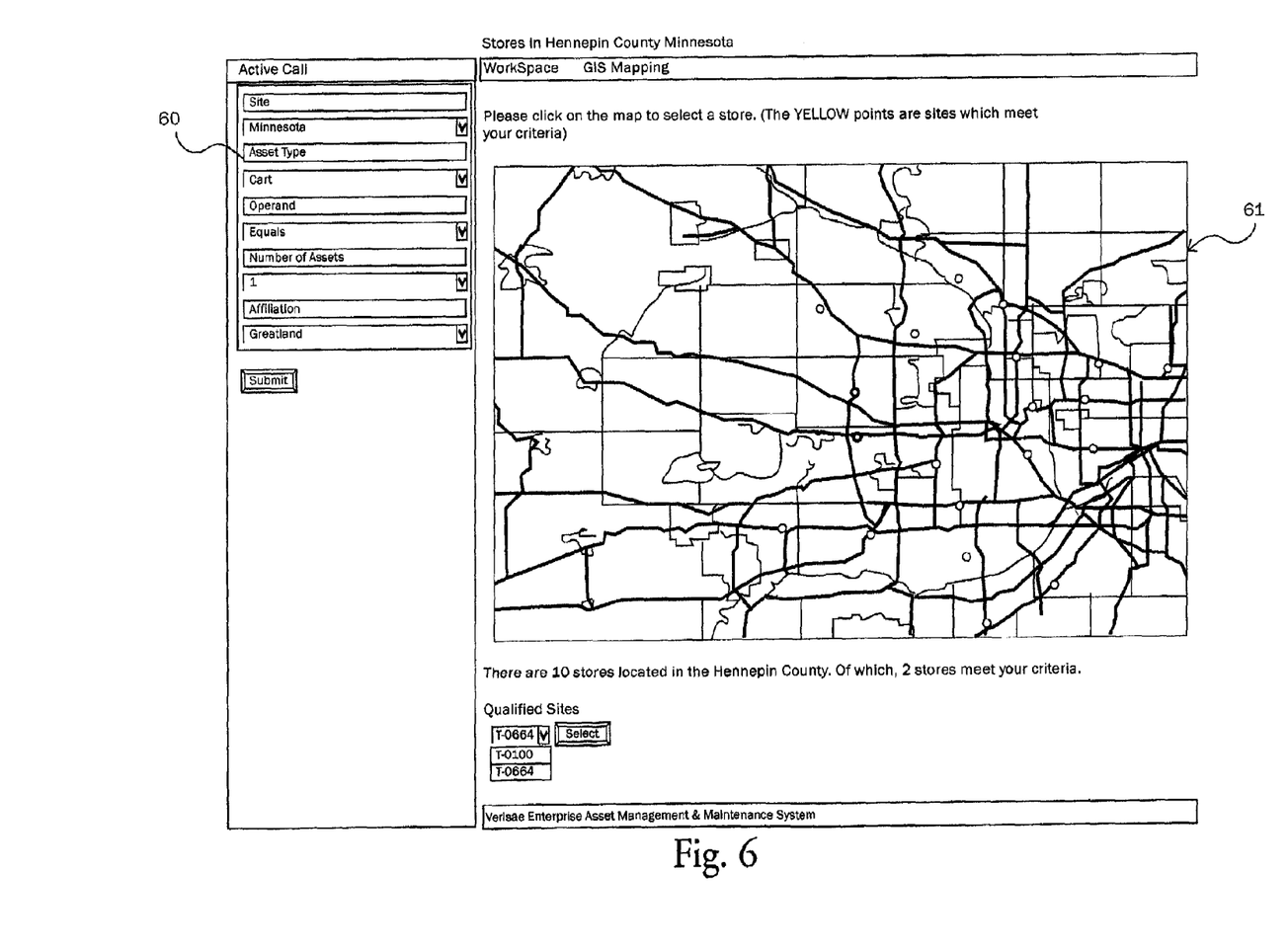
FIG. 6 is one embodiment of a GIS map produced by the subject invention.

In a distributed business environment, assets may be distributed over a large geographic region in a large number of separate facilities. As shown in FIG. 6, to track these assets geographically, one embodiment includes an application for creating a Geographic Information System (GIS) map locating a particular asset or a particular group of assets. A set of queries 60 are displayed on a client processor 12 pertaining to an asset or group of assets such as a particular asset type and a desired location. The central processor 11 then generates a map 61 based on the responses to these queries.

This embodiment can also include a mapping system displaying a single enterprise facility. Icons representing certain types of assets may be dragged and dropped onto a GIS map of a particular facility in order to display the location of assets within a facility on a scaled map.

To simplify the use of the subject invention and to maximize the options available to a user, the subject invention typically includes a compact menu structure for navigating the various functions included within the central processor 11. As shown in FIG. 4b, this menu structure may include information pertaining to the enterprise assets, the service history, and pending work orders. Because of the limited space available on the display screen of the client processor 12, it is essential that the navigational technique consume little space, while maintaining full functionality and ease-of-use.

Figure 7:
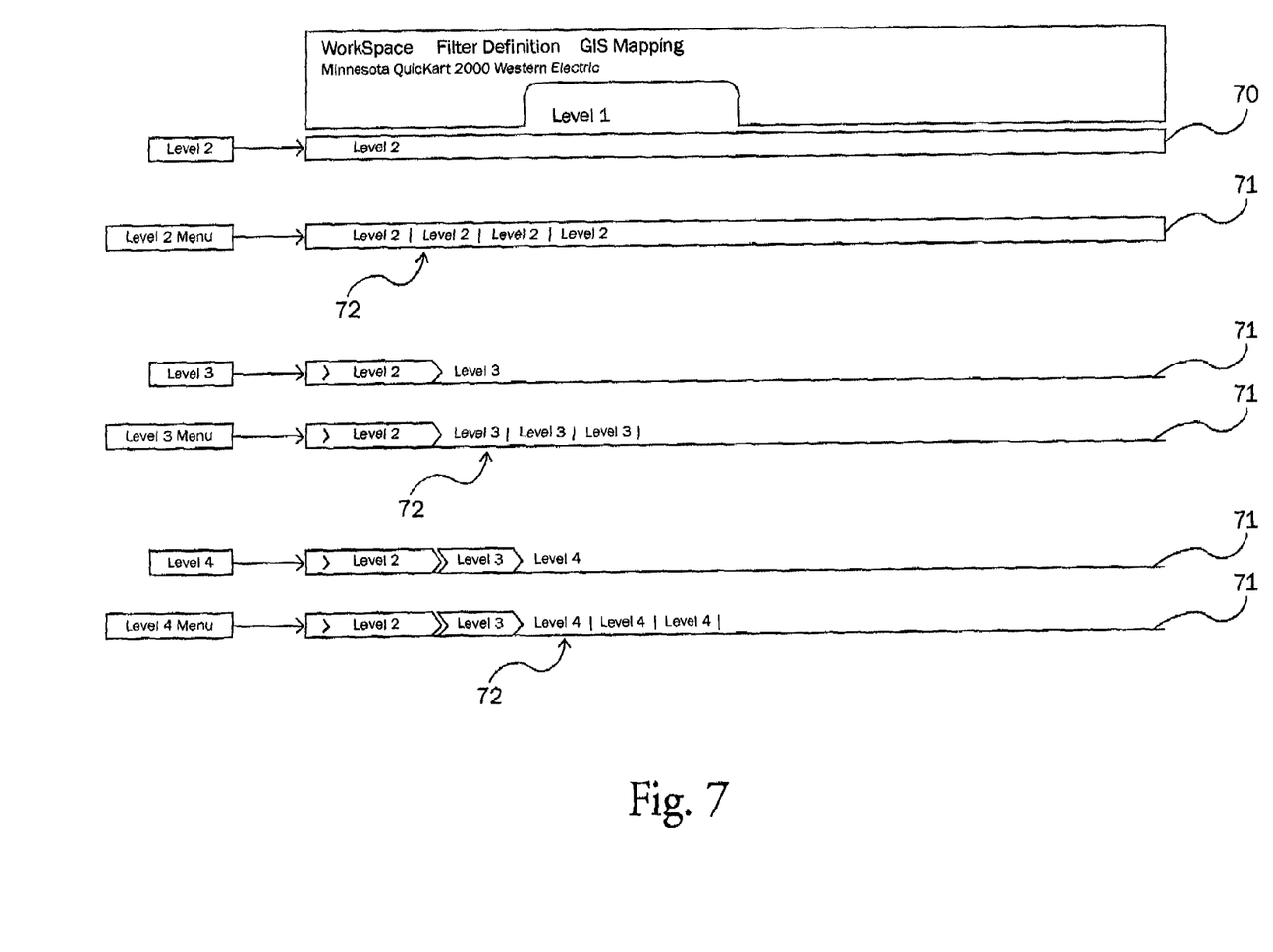
FIG. 7 is an embodiment of a menu structure shown in progressive states of expansion.

As shown in FIG. 7, in one embodiment, the compact menu structure includes two narrow, horizontally-extending sections of the client display. The upper section 70 includes a tab-based menu that provides the main level of navigation and a lower section 71 that provides all the subsections within a selected main level of navigation. A subsection having further levels of subsections have a visual indicator adjacent thereto to signify as such. In one embodiment this visual indicator is an arrow 72 located beneath the subsection, selecting any subsection having further levels will cause the lower section 71 to display all the subsections in the previously selected subsection.

For example, in one embodiment, the main navigational sections (shown in FIG. 5) include, "Sites," "Service & Maintenance," "Asset Types," "Service Providers," "Manufacturers," "Reports," and "Messages." Selection of one of these main navigational sections determines what appears on the second section. For example, in one embodiment, if the "Sites" tab is selected, the second section starts off, on the left, with a "Sites" indicator. To the right of the "Sites" indicator now appears the various subsections under the Sites portion of the menu.

In another embodiment, the main navigational levels are highlighted in the upper section and are not repeated in the lower section. In this embodiment, the lower section only includes the subsection under the main navigational section. For example, in one embodiment, the subsections under "Sites" includes, "sites" and "organizations." If the user now selects "organizations," an "organizations" indicator appears in the lower section and the subsections to "organizations" appear to the right, in the lower section. In one embodiment, the subsections under "organizations" include "summary," "address," and "roster profile." If the user selected the "address" subsection, the lower section will now contain an "organizations" indicator, followed by an "address" indicator, followed by the "address" subsections. This process continues down as many levels as is needed. This menu structure allows the users to quickly and efficiently navigate between various forms and lists of the enterprise asset management system, while consuming a narrow band on the client display.

While the subject invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims, nor is the claimed invention limited in applicability to one type of computer or computer network. Any numbering or ordering of elements in the following claims is merely for convenience and is not intended to suggest that the ordering of the elements of the claims has any particular significance other than that otherwise expressed by the language of the claims.

We claim:

1. A system for managing a plurality of assets of at least one distributed enterprise and allowing a user to access asset information, the system comprising:
   a central processor accessible on a computer network;
   a database for storing asset information for the plurality of assets of the plurality of enterprises, the database being in communication with the central processor, wherein each of the plurality of assets is a piece of equipment, and further wherein the asset information comprises information relating to ownership, maintenance and repair of the pieces of equipment;
   a client processor in communication with the central processor through the computer network, wherein the client processor inputs, queries, and downloads asset information from the central processor; and
   defined limited access levels programmed into the central processor, wherein limited access of the user to a predetermined type of asset information is determined based on the defined limited access levels and a configurable user profile of the user,
   wherein the central processor tracks information relevant to managing each of the plurality of assets,
   wherein the limited access of the user to the predetermined type of asset information is chosen from at least one of the groups consisting of:
     access solely to asset information relating to assets at a particular site,
     access solely to asset information relating to assets of a particular type,
     access solely to asset information relating to assets for which the user has a service or maintenance contract,
     access solely to asset information relating to assets which are by a warranty,
     access solely to asset information relating to assets for which the user has a work order,
     access solely to asset information relating to asset costs, and
     access solely to asset information relating to asset usage.

2. The system of claim 1, wherein the configurable user profile further comprises predetermined user roles and rights.

3. The system of claim 1, wherein the configurable user profile comprises configurable user attributes, the configurable user attributes configured to be chosen from at least one of the group consisting of company of the user, position of the user in the company, and type of user.

4. The system of claim 3, wherein the configurable user attributes further comprise sites at which the user may access asset information.

5. The system of claim 1, further comprising:
   a database for storing service provider information, the database being in communication with the central processor,
   wherein the central processor is configured to automatically identify an appropriate service provider for a particular asset based on the particular asset and the service provider information, and
   wherein the central processor is configured to automatically alert the appropriate service provider of a service request.

6. The system of claim 5, wherein the client processor is configured to automatically alert the appropriate service provider via an e-mail.

7. The system of claim 5, wherein the client processor is configured to automatically alert the appropriate service provide via an automated phone call.

8. The system of claim 5, wherein the client processor is configured to automatically alert the appropriate service provide via a text message.

9. The system of claim 5, wherein the client processor is further configured to automatically transmit a second alert to the appropriate service provider after a predetermined period of time.

10. The system of claim 9, wherein the client processor is further configured to automatically transmit a third alert to the appropriate service provider after a second predetermined period of time.

11. The system of claim 5, wherein the client process is further configured to automatically transmit a second alert to another service provider after a predetermined period of time.

12. The system of claim 5, wherein the appropriate service provider is a third party service provider.

13. The system of claim 5, wherein the client processor is configured to receive input relating to a service need and thereby generate the service request and transmit the service request to the central processor.

14. The system of claim 13, wherein the input relating to a service need is provided by a user or an asset interface.

15. The system of claim 1, wherein the central processor is programmed with code for calculating a total cost of ownership.

16. The system of claim 1, wherein the central processor is programmed with code for selectively filtering asset information available to a user based on the defined limited access levels and the configurable user profile.

17. The system of claim 1, wherein the user is an agent of the enterprise.

18. The system of claim 1, wherein the user is a service provider.

19. The system of claim 1, wherein the user is an equipment manufacturer.

20. The system of claim 1, wherein the limited access of the user to the predetermined type of asset information further comprises access solely to asset information relating to a specific one or more of the at least one distributed enterprises.

21. A system for managing a plurality of assets of at least one distributed enterprise at a plurality of sites and allowing a user to access asset information, the system comprising:
   a central processor accessible on a computer network;
   a database for storing service provider information and asset information for the plurality of assets of the plurality of enterprises, the database being in communication with the central processor, wherein each of the plurality of assets is a piece of equipment, and further wherein the asset information comprises information relating to ownership, maintenance and repair of the pieces of equipment;
   a client processor in communication with the central processor through the computer network, wherein the client processor inputs, queries, and downloads asset information from the central processor;
   a first limited access level programmed into the central processor, the first limited access level comprising access to a first predetermined subset of information, the first predetermined subset of information comprising the service provider and asset information, wherein a first user type has access to the first limited access level;

a second limited access level programmed into the central processor, the second limited access level comprising access to a second predetermined subset of information, the second predetermined subset of information comprising the service provider information and the asset information for predetermined sites, wherein a second user type has access to the second limited access level;

identification software associated with the central processor, the identification software configured to automatically identify an appropriate service provider for a particular asset based on the particular asset and the service provider information; and notification software associated with the central processor, the notification software configured to automatically alert the appropriate service provider of a service request.

22. The system of claim 21, further comprising a third limited access level programmed into the central processor, the third limited access level comprising access to a third predetermined subset of information, the third predetermined subset of information comprising the asset information for predetermined assets, wherein a third user type has access to the third limited access level.

23. The system of claim 22, wherein the appropriate service provider is a third user type.

24. The system of claim 22, wherein the third user type has rights to add or modify any asset information relating to the predetermined assets.

25. The system of claim 22, wherein the third user type is a manufacturer and further wherein the predetermined assets are all assets manufactured by the manufacturer.

26. The system of claim 22, wherein a user is determined to be one of the first user type, the second user type, or the third user type based on the hierarchical enterprise status of the user.

27. The system of claim 21, wherein the first user type has full rights to operate the system.

28. The system of claim 21, wherein the second user type has rights to add or modify any asset information relating to the assets at the predetermined sites and further has rights to submit work orders relating to the assets at the predetermined sites.

29. The system of claim 21, wherein a user is determined to be one of the first user type or the second user type based on the hierarchical enterprise status of the user.

30. The system of claim 21, further comprising a fourth limited access level programmed into the central processor, the fourth limited access level comprising access to a fourth predetermined subset of information, the fourth predetermined subset of information comprising the asset information for a predetermined one or more of the at least one distributed enterprise, wherein a fourth user type has access to the fourth limited access level.

31. A system for managing a plurality of assets of a plurality of distributed sites of an enterprise and allowing a user to access asset information, the system comprising:

(a) a central processor accessible on a computer network;
(b) a database for storing service provider information and asset information for the plurality of assets of the plurality of distributed sites, the database being in communication with the central processor, wherein each of the plurality of assets is a piece of equipment, and further wherein the asset information comprises information relating to ownership, maintenance and repair of the pieces of equipment;
(c) a client processor in communication with the central processor through the computer network, wherein the client processor inputs, queries, and downloads asset information from the central processor;
(d) at least one predetermined limited user access level programmed into the central processor, wherein the at least one predetermined limited user access level is configured to restrict access of the user to a predetermined subset of asset information based on a configurable user profile of the user;
(e) identification software associated with the central processor, the identification software configured to automatically identify an appropriate service provider for a particular asset; and
(f) notification software associated with the central processor, the notification software configured to automatically alert the appropriate service provider of a service request.

32. The system of claim 31, wherein the predetermined subset of asset information comprises asset information relating to assets at a single particular site of the plurality of distributed sites.

33. The system of claim 31, wherein the predetermined subset of asset information comprises asset information relating to assets of a particular type among several asset types.

34. The system of claim 31, wherein the predetermined subset of asset information comprises asset information relating to assets for which the user has a service or maintenance contract, wherein the user is a service provider.

35. The system of claim 31, wherein the predetermined subset of asset information comprises asset information relating to assets for which the user has a work order, wherein the user is a service provider.

36. The system of claim 31, wherein the configurable user profile comprises configurable attributes.

37. The system of claim 36, wherein the configurable attributes comprise at least one of company of the user, position of the user in the company, type of user, and sites at which the user may access asset information.

38. The system of claim 31, further comprising at least one asset interface associated with one of the assets, wherein the at least one asset interface is in communication with the central processor, wherein the central processor is configured to monitor and control at least a portion of the asset via the at least one asset interface.

39. The system of claim 31, wherein the identification software is configured to automatically identify the appropriate service provider for the particular asset based on at least one of:

(a) which service provider is linked to the particular asset; and
(b) a geographic location of the service provider and the particular asset.

* * * * *

UNITED STATES PATENT AND TRADEMARK OFFICE
CERTIFICATE OF CORRECTION

| | | |
|---|---|---|
| PATENT NO. | : 7,496,532 B2 | Page 1 of 2 |
| APPLICATION NO. | : 09/883779 | |
| DATED | : February 24, 2009 | |
| INVENTOR(S) | : Daniel T. Johnson et al. | |

It is certified that error appears in the above-identified patent and that said Letters Patent is hereby corrected as shown below:

On the title page: Add the following references:

item 56 References Cited: U.S. Patent Documents
| | | |
|---|---|---|
| --6,211,782 | 4/2001 | Sandelman et al.-- |
| --6,892,546 | 5/2005 | Singh et al.-- |
| --7,062,389 | 6/2006 | Johnson et al.-- |
| --7,142,949 | 11/2006 | Brewster et al.-- |
| --7,149,701 | 12/2006 | McKinney-- |
| --7,196,621 | 3/2007 | Kochis-- |
| --7,259,675 | 8/2007 | Baker et al.-- |
| --7,304,573 | 12/2007 | Postma-- |
| --7,333,880 | 2/2008 | Brewster et al.-- |
| --7,369,968 | 5/2008 | Johnson et al.-- |
| --2002/0070971 | 6/2002 | Brown et al.-- |
| --2004/0078306 | 4/2004 | Whiteley et al.-- |
| --2004/0111697 | 6/2004 | Johnson et al.-- |
| --2004/0193449 | 9/2004 | Wildman et al.-- |
| --2004/0225676 | 11/2004 | Johnson et at.-- |
| --2005/0021710 | 1/2005 | Johnson et al.-- |
| --2005/0086163 | 4/2005 | Johnson et al.-- |
| --2005/0248454 | 11/2005 | Hanson et al.-- |
| --2007/0043538 | 2/2007 | Johnson et al.-- |
| --2007/0096899 | 5/2007 | Johnson et al.-- |
| --2007/0260405 | 11/2007 | McConnell et al.-- |
| --2007/0268138 | 11/2007 | Chung et al.-- | item 56 References Cited: Other Publications
--Air Force Refrigerant Management Program, Quinn Hart, manager, Refrigerant Management Handbook, June 1994, 267 pp.--

CERTIFICATE OF CORRECTION (continued)
U.S. Pat. No. 7,496,532 B2

Column 9
Line 16, Claim 1: Replace "plurality of enterprises" with --at least one enterprise--

Column 10
Lines 8-9, Claim 7: Replace "provide" with --provider--

Lines 11-12, Claim 8: Replace "provide" with --provider--

Lines 54-55, Claim 21: Replace "plurality of enterprises" with --at least one enterprise--

Column 11
Line 62, Claim 31: Replace "the" with --a--

Signed and Sealed this

Fifth Day of January, 2010

David J. Kappos
*Director of the United States Patent and Trademark Office*